United States Patent
Schuh et al.

(10) Patent No.: US 8,043,496 B1
(45) Date of Patent: Oct. 25, 2011

(54) SYSTEM FOR EXTRACTING OIL FROM ALGAE

(76) Inventors: Peter Allen Schuh, Pleasanton, CA (US); Allen John Schuh, Pleasanton, CA (US)

(*) Notice: Subject to any disclaimer, the term of this patent is extended or adjusted under 35 U.S.C. 154(b) by 472 days.

(21) Appl. No.: 12/341,380

(22) Filed: Dec. 22, 2008

Related U.S. Application Data

(60) Provisional application No. 61/037,675, filed on Mar. 18, 2008.

(51) Int. Cl.
*B01D 17/00* (2006.01)
*C10L 5/42* (2006.01)

(52) U.S. Cl. ........... 210/121; 44/605; 44/629; 47/1.4; 210/173; 210/182; 210/257.1; 210/258; 210/259; 210/519; 241/2; 241/68; 241/83; 241/301; 435/259

(58) Field of Classification Search ............ 47/1.4; 44/307, 605, 629, 639; 210/104, 121, 123, 210/173, 257.1, 258, 179, 182, 259, 513, 210/519, 521, 522, 540; 435/234, 257.1, 435/243, 259; 241/2, 63, 68, 83, 301
See application file for complete search history.

(56) References Cited

U.S. PATENT DOCUMENTS

| | | | | |
|---|---|---|---|---|
| 2,996,188 A * | 8/1961 | May | ......... | 210/114 |
| 4,341,038 A * | 7/1982 | Bloch et al. | ......... | 47/1.4 |
| 4,802,978 A * | 2/1989 | Schmit et al. | ......... | 210/104 |
| 5,387,267 A * | 2/1995 | Warf et al. | ......... | 44/589 |
| 5,858,252 A * | 1/1999 | Darcy | ......... | 210/788 |
| 6,000,551 A * | 12/1999 | Kanel et al. | ......... | 209/164 |
| 7,135,308 B1 * | 11/2006 | Bush et al. | ......... | 435/42 |
| 7,311,838 B2 | 12/2007 | Herold et al. | | |
| 7,419,596 B2 | 9/2008 | Dueppen et al. | | |
| 7,431,841 B2 | 10/2008 | Herold et al. | | |
| 7,431,952 B2 | 10/2008 | Bijl et al. | | |
| 7,435,707 B2 | 10/2008 | Langer et al. | | |
| 7,435,715 B2 | 10/2008 | Broeckx et al. | | |
| 7,439,034 B2 | 10/2008 | Weiner et al. | | |
| 7,950,181 B2 * | 5/2011 | McCall | ......... | 47/1.4 |
| 2007/0048848 A1 * | 3/2007 | Sears | ......... | 435/134 |
| 2011/0047863 A1 * | 3/2011 | Trimbur et al. | ......... | 44/307 |

OTHER PUBLICATIONS

Khan, L. M., and Hanna, M. A. "Expression of Oil From Oilseeds, A Review", Journal of Agricultural Engineering Research, v. 28, pp. 495-503 (1982).
U.S. Government Publication, National Renewable Energy Laboratory (NREL), "A Look Back at the U.S. Department of Energy's Aquatic Species Program: Biodiesel from Algae", NREL TP-580-24190, www.nrel.gov/docs/legosti/fy98/24190.pdf, (1998). pp. 1-14.
Kertz, Glen, "Algae: The ultimate in renewable energy", Apr. 1, 2008: http://www.cnn.com/2008/TECH/science/04/01/algae.oil/index.html.

* cited by examiner

*Primary Examiner* — Joseph Drodge
(74) *Attorney, Agent, or Firm* — David Pressman

(57) ABSTRACT

A method and apparatus for extracting oil from algae comprises a disruptor (125) having a plurality of deflectors (220 and 225) against which a mixture of algae and water (100) is forcibly impacted upon the urging of a pump (115). The impacting of the algal cells against the deflectors ruptures their cell walls and liberates the lipids (oil) and other materials contained therein. A tank (130) collects the mixture and after a settling period, the mixture forms at least three layers comprising oil (155), water (160), and algal residue (165). The oil layer is removed through one or more conduits (177, 178) into a holding tank (185) for further refining and use. The water is discarded, and the biomass residue comprising algal cell walls and other non-oil components is removed to another holding container (199) from which it can be discarded or used as an agricultural fertilizer or the like. If desired, the residue can be further treated in order to scavenge any remaining oil.

16 Claims, 2 Drawing Sheets

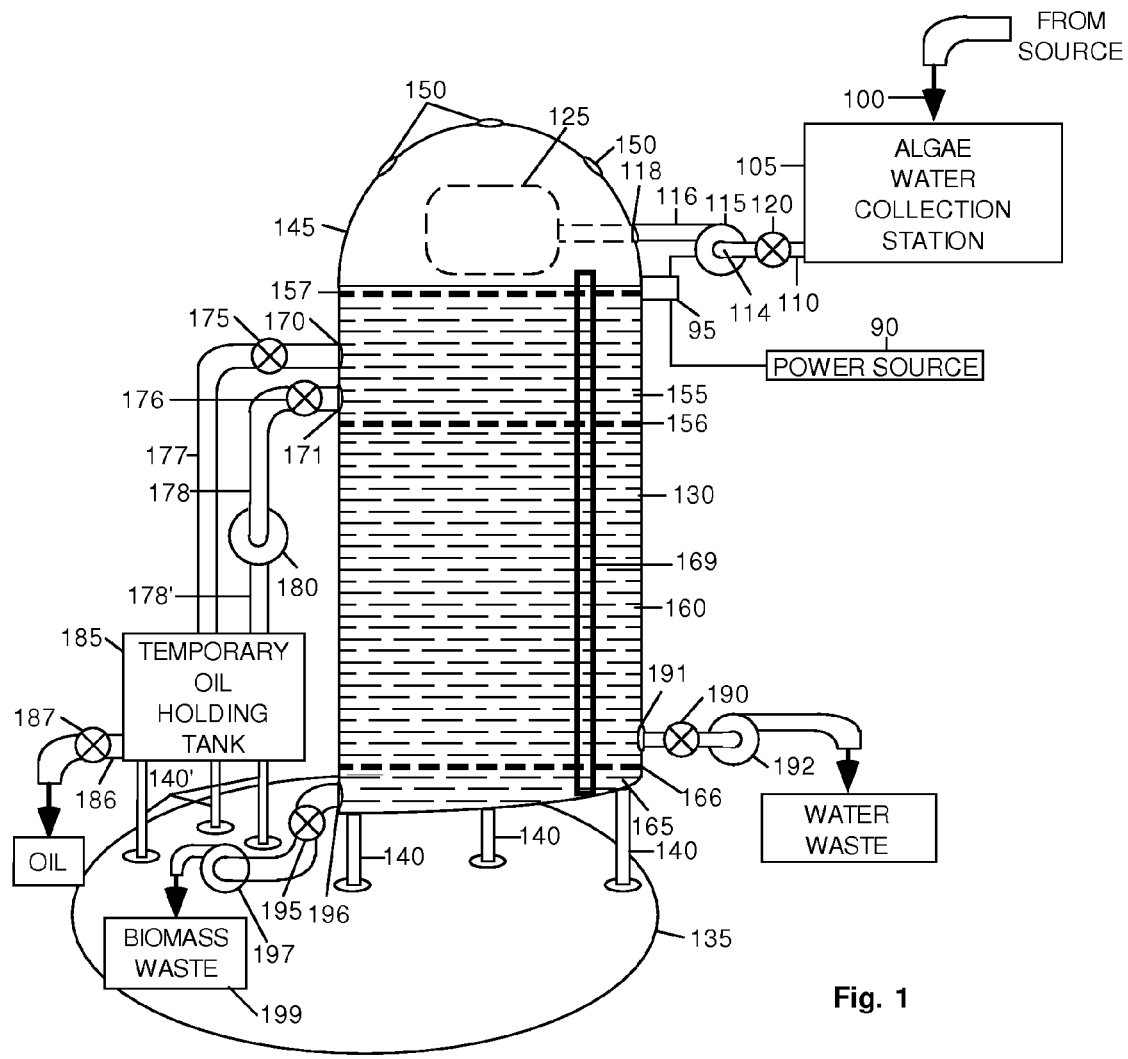
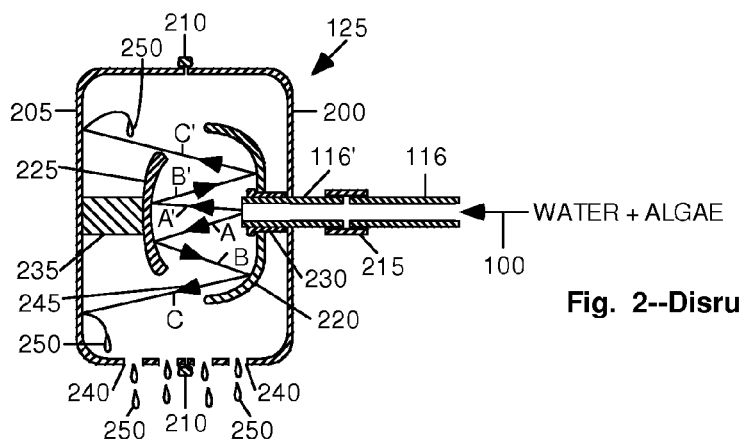
Fig. 1
Fig. 2--Disruptor Head

SYSTEM FOR EXTRACTING OIL FROM ALGAE

CROSS REFERENCE TO RELATED APPLICATIONS

This application claims priority of our provisional patent application, Ser. No. 61/037,675, filed Mar. 18, 2008.

BACKGROUND

1. Field

The field is extraction of substances, and in particular the extraction of oil from algae.

2. Prior Art

The following is a list of some prior art that presently appears relevant:

| Pat. or Pub. Nr. | Kind Code | Issue or Pub. Date | Patentee or Applicant |
| --- | --- | --- | --- |
| 7,311,838 | B2 | Dec. 25, 2007 | Herold et al. |
| 7,419,596 | B2 | Sep. 2, 2008 | Dueppen et al. |
| 7,431,841 | B2 | Oct. 7, 2008 | Herold et al. |
| 7,431,952 | B2 | Oct. 7, 2008 | Bijl et al. |
| 7,435,707 | B2 | Oct. 14, 2008 | Langer et al. |
| 7,435,715 | B2 | Oct. 14, 2008 | Broeckx et al. |
| 7,439,034 | B2 | Oct. 21, 2008 | Weiner et al. |

NON-PATENT LITERATURE DOCUMENTS

KHAN, L. M., and HANNA, M. A. "Expression of Oil From Oilseeds, A Review", Journal of Agricultural Engineering Research, v. 28, pp. 495-503 (1982).

U.S. GOVERNMENT PUBLICATION, National Renewable Energy Laboratory (NREL), "A Look Back at the U.S. Department of Energy's Aquatic Species Program: Biodiesel from Algae", NREL TP-580-24190, www.nrel.gov/docs/legosti/fy98/24190.pdf, (1998).

KERTZ, GLEN, "Algae: The ultimate in renewable energy", http://www.cnn.com/2008/TECH/science/04/01/algae-.oil/index.html.

Like other plants, algae stores energy in the form of lipids (fats or oils). Algae cultivation has potential for oil production both because of its fast growth rate and the high oil content of some varieties. Some species of algae are so rich in oil that it accounts for over 50% of their mass, not counting the water, which is over 90% of the algae by volume. Some species of algae are 50% lipids. It is generally believed that the majority of oil and natural gas originated from algae in ancient oceans.

The U.S. National Renewable Energy Laboratory (NREL) has identified approximately 300 species of algae, as varied as the diatoms (genera *Amphora, Cymbella, Nitzschia*) and green algae (genera *Chlorella*, in particular) as potentially good sources of oil from algae. Diatoms, or bacillariophytes, are unicellular, microscopic algae or microalgae. These organisms are widespread in salt water where they constitute the largest portion of phytoplankton biomass. There exist approximately 100,000 known species around the world. More than 400 new specimens are described each year.

Kertz, supra, claims algae can be a competitive source for biofuels in the future. He claims to be able to produce about 936,000 liters of algae oil per year per hectare (2.471 acres), compared to about 280 liters per hectare per year from corn, and about 470 liters per hectare per hear from soybeans.

Whether in the wild or in manufacture, the process of harvesting algae starts with gentle dredging so as not to disrupt the plant in a situation where it is not possible to recover the oil that spills out during the harvest. The gentle handing continues while the algae are transported to a processor for oil extraction. Everything possible is done so as to lose none of the oil until it is over a catch basin. When the algae arrives at the processing station, it appears as dots, strings, and clumps, and they may be of any color, with unknown oil content.

There are two major production and extraction hurdles to overcome.

The first hurdle is to develop an efficient, affordable construction and processing method to control the environment to promote optimum algae growth. High oil species of microalgae such as spirulina cultured in growth-optimized conditions of photo-bioreactors have the ability to grow while performing beneficial tasks, such as scrubbing power plant flue gases or removing nutrients from wastewater. By coupling algae production with a waste treatment or pollution control process, as has already being done by some companies, the economic viability of microalgal (i.e., that derived from microalgae) biodiesel is improved.

The second hurdle is the efficient harvesting and extraction of oil from the microscopic algae biomass. The process begins with separating the algae cells from the water in which they live. The process must be sensitive not to release oil before it can be captured in a retaining device during harvest or transportation to an oil extractor.

It is desirable to improve the process economics of producing microalgal oil. The most difficult part of oil extraction from algae is breaking the cell walls and separating the oil from the water that is inside the algae cells. This must be done under controlled conditions where it is safe, fast, simple, and can achieve a very high yield.

The challenge for companies engaged in the algae-to-biofuel business is to find an energy-efficient oil extraction method. Failure to find an adequate method has limited expansion of the field to date.

Oil extraction from algae can determine the sustainability of algae-based biodiesel. In terms of the concept, the problem is quite simple: Extract the algae from its growth medium using an appropriate separation process, and use the wet algae immediately to extract the oil. The volumes of the useable yield are the problem. To yield one barrel of diesel oil the amount of raw material (algae and its growth medium) harvested may have to be over 20 times greater in initial volume arriving at the separator. To make a diesel fuel extraction unit economically viable, the unit would have to extract at least about 3,780,000 liters of diesel fuel per year. Using the 20 times relationship, this would require the amount of raw material (algae and its growth medium) to exceed 75,600,000 liters. The economies of scale require that the rate of production exceed 8,700 liters per hour, 24 hours a day, 365 days a year. The extraction process has to be simple, fast, safe, low-cost, and capable of processing a massive amount of material in a short period.

Extracting oil from algae has been accomplished in laboratory settings as a demonstration only. It has been done on very small volumes and with often no regard to time, expense, or to safety or efficiency in some cases. The ways that are currently being used fall into the general categories mechanical or chemical. All of them are inadequate to the needs of a production unit. They are only mentioned as the alternative methods that have been tried to date.

Among the mechanical procedures, the algae are treated as though they were a seed from row crops or orchards. Generally, the recommended pre-pressing operations for oil expression include grinding or flaking and then cooking pre-cleaned raw material. Pressure, temperature, pressing time, and moisture content are the factors that affect oil yield during expression processing of oilseeds. When algae are dried, they retain their oil content, whereafter they can be pressed out with an oil press. These methods have been practiced for thousands of years and include the olive-oil-press method, which is suitable for fresh olive, peanuts, soybeans, rapeseeds, tea seeds, walnut, sunflower seeds, sesame, rice bran, and corn. Cold pressing (temperatures of around 40° C.) produces high quality oils, but the residues left behind still have a residual oil content of 15-25%. The method is slow and inefficient. The pulp remaining is called "expeller pulp", as it is expelled from the pressing process. Other processes use the chemical hexane to extract the oil but users are required to obtain the hexane, which may be locally not available. This method is described below.

The residual oil content may be removed from the expeller pulp by additional hydraulic pressing, hot pressing, or extraction. The residues that then arise during hydraulic pressing are known as oil cake. Hydraulic expression produces larger pieces of oil cake than does cold pressing, the residual oil content amounting to less than 6%. With hot pressing (expeller final pressing) the starting materials for this process are either oil seeds with a low oil content or expeller pulp produced during cold pressing of oil-rich seeds. The pulped material is heated to approximately 70° C. in final screw presses, so that more cells are macerated than during cold pressing. The residues arising are known as expeller, which has a residual oil content of 5 to 10%. Thus, an additional step is added and this slows the procedure even more.

Yield data reported correspond to hydraulic presses while the current technology, at least in the U.S.A., for expression processing is the screw press. Research is still needed to determine if these factors affect the screw-pressing process in the same way and to the same extent as they do in a static pressing operation.

Mechanical pressing of oilseeds is the most widely used method for oil expression in the world. However, the mechanical oil expellers (screw presses) employed for this purpose leave about 8 to 14% of the expressible oil in the de-oiled cake. Normally 3 to 5 passes in conventional oil expellers are required for an oil recovery of about 80%. The maximum throughput capacity of an expeller may only be 25 kg/h while its effective capacity (two passes) may be only 15 kg/h.

For maximum efficiency, the surface contacting materials are made of stainless steel to ensure high quality of oil. The working capacity is slow, perhaps at maximum 1,500 kg/8 hours. It can be highly automatic. One worker can operate the machine. However, it can never achieve the levels required for a biodiesel production facility.

Osmotic shock is a sudden reduction in osmotic pressure, which can cause cells in a solution to rupture. Osmotic shock is sometimes used to release cellular components such as oil. This has been attempted on a very small scale. It is expensive and has not been able to treat high volumes required of a biodiesel production facility.

Ultrasonic extraction can greatly accelerate extraction processes. Using an ultrasonic reactor, ultrasonic waves are used to create cavitation bubbles in a solvent material. When these bubbles collapse near the cell walls, they create shock waves and liquid jets cause those cell walls to break and release their contents into the solvent. This method is expensive and has not been able to treat high volumes required of a biodiesel production facility.

Algae oil can be extracted using hexane after the oil press/expeller method. After the oil has been extracted using an expeller, the remaining pulp can be mixed with hexane to extract the remaining oil content. Benzene and ether have been used, but the most popular chemical for solvent extraction is hexane because it is relatively inexpensive. The oil dissolves in the hexane, and the pulp is filtered out from the solution. The oil and hexane are separated by means of distillation. Two stages together (cold press and hexane solvent) may be able to extract more than 95% of the total oil present in the algae. While it works, solvent extraction of oils carries with it cost and safety issues.

The use of solvents for oil extraction has the inherent dangers involved in working with the chemicals. Benzene is classified as a carcinogen. Care must be taken to avoid exposure to vapors and direct contact with the skin, either of which can cause serious damage. Chemical solvents also present the problem of being an explosion hazard. Another drawback of using solvent extraction is that it requires extra energy input to recover the solvents, and it has the potential to contaminate the algae solids, thereby restricting options for their end use.

Another method, enzymatic extraction, uses enzymes to degrade the cell walls with water acting as the solvent makes fractionation of the oil much easier. The costs of this extraction process are estimated to be much greater than hexane extraction.

In another method, supercritical fluid/carbon dioxide ($CO_2$) extraction, $CO_2$ is liquefied under pressure and heated to the point that it has the properties of both a liquid and gas. This liquefied fluid then acts as the solvent in extracting the oil. Almost 100% of the oil can be extracted using this method but it is expensive. This method needs special equipment for containment and pressure. The process can also be quite dangerous if there is a mechanical failure and temperatures are not controlled.

In summary, all of these known oil extraction methods have one or more of the following drawbacks: a low-volume capacity, high cost, complex procedure, dangerous procedure, slow separation of oil from algae, and low efficiency. These drawbacks have limited expansion of the field of oil extraction from algae.

SUMMARY

A method and system for simple, safe, high volume, low cost, and fast separation of oil from algae are disclosed. In one embodiment the method and system improve the process economics of producing microalgal oil over the prior art in that the oil can be immediately available for biodiesel processing, the water is recycled back into the system, and the residual mass can be made available for various agricultural or other green applications. In one aspect of this embodiment, a mixture of water and algae are entrained from a source and forcibly and with pressure impacted at a high velocity against one or more surfaces having various properties, thereby causing the algae to rupture and release their inner contents, including oils, for subsequent separation.

DRAWING FIGURES

FIG. 1 is a schematic diagram of a preferred embodiment of a system for separating oil from algae.

FIG. 2 is a cross-sectional view of a disruptor head used in the embodiment of FIG. 1.

DRAWING FIGURE REFERENCE NUMERALS

Figure 3:
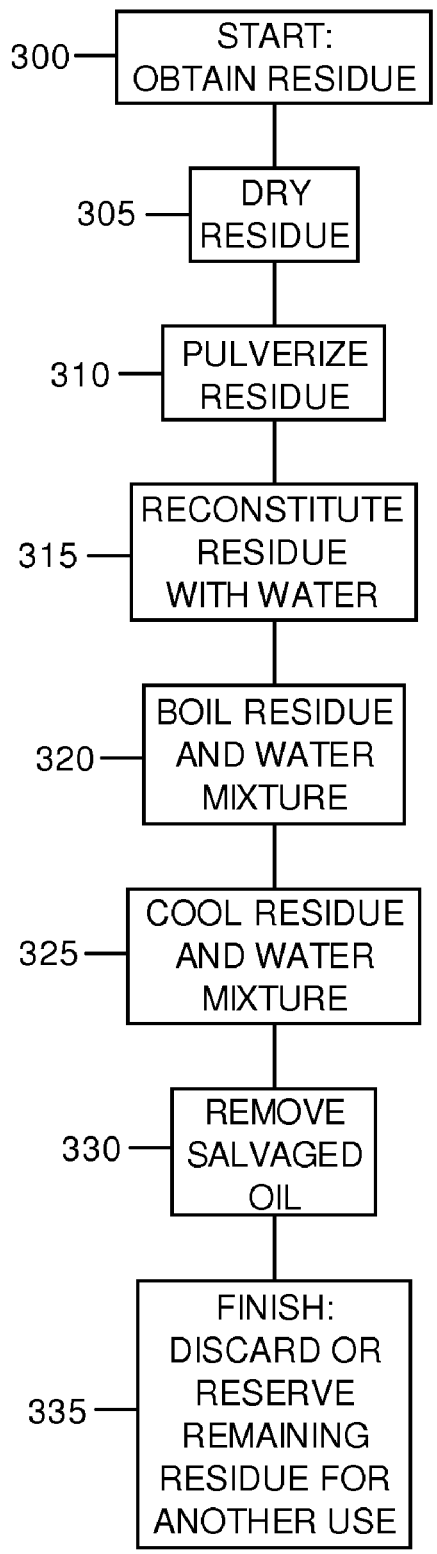
FIG. 3 is a flow chart showing steps for scavenging oil from left-over algal residue.

| | | | |
|---|---|---|---|
| 90 | Source | 95 | Switch |
| 100 | Mixture | 105 | Station |
| 110 | Port | 114 | Inlet |
| 115 | Pump | 116 | Outlet Pipe |
| 118 | Port | 120 | Valve |
| 125 | Disruptor Head | 130 | Tank |
| 135 | Surface | 140 | Leg |
| 145 | Cover or Dome | 150 | Vent |
| 155 | Oil | 156 | Oil-Water Line |
| 160 | Water | 165 | Residue |
| 166 | Water-Residue Line | 169 | Sight Glass |
| 170 | Oil Exit Port | 171 | Alternative Oil Exit Port |
| 175 | Oil Exit Port Valve | 176 | Alternative Oil Exit Port Valve |
| 177 | Oil Exit Port Pipe | 178 | Alternative Oil Exit Port Pipe |
| 180 | Pump | 185 | Oil Holding Tank |
| 187 | Oil Tank Valve | 190 | Water Exit Port Valve |
| 191 | Water Port | 192 | Pump |
| 195 | Biomass Waste Port Valve | 196 | Biomass Waste Port |
| 197 | Pump | 199 | Biomass Waste Tank |
| 200 | Right-hand Head portion | 205 | Left-hand Head portion |
| 210 | Clamp | 215 | Coupler |
| 220 | Second Deflector | 225 | First Deflector |
| 230 | Collar | 235 | Base |
| 240 | Hole | 245 | Arrow |
| 250 | Droplets | 300-335 | Steps |

FIRST EMBODIMENT

Description—FIGS. 1 and 2

The Tank and its Attachments

FIG. 1

FIG. 1 shows a schematic diagram of one aspect of a preferred embodiment of a separator for receiving a mixture of water containing algae and ejecting separately water, biomass, and the oil in the algae at separate output ports.

A mixture of water containing algae 100 is supplied to a first collection station 105. Mixture 100 is obtained from an algae growth station, river, ocean, pond, lake, or any other body of water in which algae are found. Station 105 has an outlet port 110 that is connected through an optional valve 120 to a pump 115 that has an inlet 114 and an outlet 116. Pump 115 is powered by a power source 90. A float switch or other level sensor 95 is normally closed, permitting pump 115 to operate. When the fluid level in tank 130 reaches a predetermined height, switch 95 opens, disconnecting power source 90 and stopping the operation of pump 115. Valve 120 is used to regulate flow from station 105 to pump 115. Instead of being located at the inlet to pump 115, valve 120 can instead be placed in outlet pipe 116, if desired. Outlet pipe 116 is connected to a disruptor head or housing 125. Head 125 is described in detail below, but its function is to disrupt, tear, puncture, rend, or otherwise damage the algal cell walls, thereby causing release of the contents within the algal cells into the water-algae mixture.

Head 125 is housed within a tank 130 that is optionally secured to a mounting surface 135 by a plurality of legs 140. Tank 130 further includes an optional cover or dome 145 to prevent splatter of water, algae, or oil from leaving tank 130. Cover 145 includes one or more vent holes 150 to permit the interior of tank 130 and its contents to remain at ambient atmospheric pressure. Cover 145 further includes a port 118 through which outlet pipe 116 passes. Head 125 can be supported by pipe 116 as it rests on port 118, or another means.

After separation, the contents of tank 130 comprise a layer of oil 155, a layer of water 160, and a layer of algae biomass residue 165. Heavy dashed lines 156 and 166 respectively indicate the interfaces between oil 155 and water 160 and between water 160 and biomass residue 165. Heavy dashed line 157 indicates the top of oil layer 155. A transparent sight glass 169 is optionally attached to tank 130 to permit an operator to view the individual heights of the three layers.

After the three components are separated, they are removed through a series of outlets connected to tank 130. Since it is the lightest component, oil layer 155 rests on top of water layer 160, which in turn rests on biomass residue layer 165 at the bottom of tank 130. As the amounts of oil in algae and algae in mixture 100 can vary, the position of interface 156 is uncertain. If the oil content in the algae is low, interface 156 will be relatively higher after separation. If the oil content in the algae is high, interface 156 will be relatively lower after separation. In order to accommodate these differences in the position of interface 156, a plurality of exit ports 170 (upper) and 171 (lower) for oil layer 155 are provided. Although two exit ports are shown, any number can be used. A pair of valves 175 (upper) and 176 (lower) are connected to ports 170 and 171, respectively. Valves 175 and 176 are preferably located as close to the outer wall of tank 130 as possible in order to prevent water 160 from entering lower port 171 and later flowing out with oil 155 as it is removed from tank 130. Valves 175 and 176 are respectively connected to pipes 177 and 178. When valves 175 and 176 are opened, oil layer 155 flows downward under the force of gravity in the case of pipe 177, or as urged by optional pump 180 in the case of pipe 178, which continues as pipe 178' after pump 180. A pump (not shown) can be inserted in pipe 177 also, if desired.

Pipes 177 and 178 drain into a collection tank 185 which temporarily holds oil 155. Tank 185 is also optionally supported by legs 140' on surface 135. An outlet pipe 186 connects tank 185 to a valve 187. When valve 187 is opened, the oil in tank 185 (derived from oil 155 in tank 130), is released for further refinement and use.

A valve 190 connected to an output port 191 in tank 130 permits draining of water 160 from tank 130. A pump 192 can optionally be used to urge water 160 through valve 190. After leaving tank 130, water 160 is optionally ejected as waste or retained for further treatment.

A valve 195 connected to an output port 196 permits removal of biomass waste 165. An optional pump 197 speeds removal of biomass 165 from tank 130. Biomass 165 is preferably retained in a collection tank 199 for further treatment, as described below.

The diameter and height of tank 130 are preferably 1.5 and 3 meters, although other sizes can be used. Dome 145 is preferably made of a plastic material such as acrylic polymer. It is sized and scaled according to the size of tank 130. Pumps 114, 180, 190, and 197 are powered by electric, pneumatic, or hydraulic motors or by an internal combustion engine, or by a combination of motive forces. Valves 120, 175, 187, 190, and 195 can be manually operated, or powered by external motive forces. Tank 130 can be made of steel, aluminum, plastic, fiberglass composite, or other materials. The walls of tank 130 are preferably between 1 and 5 mm thick, depending upon the material used.

The Disruptor Head

FIG. 2

FIG. 2 shows a detailed, cross-sectional view of a-disrupting head 125 as used in dome 145 of the separator of FIG. 1 according to one aspect of the present embodiment. Head 125 is arranged to disrupt algae within an algae-water mixture, and to deliver a mixture of water, algae, and disrupted algae to a settling tank.

Head 125 comprises a cover with a first portion 200 and a second portion 205. Portions 200 and 205 are held together by a clamping mechanism 210. Pipe 116 is optionally divided into two sections 116 and 116' that are securely joined by a coupler 215. Mechanism 210 and coupler 215 permit opening, inspection, repair, and removal of head 125.

Head 125 further includes first and second deflectors 220 and 225, respectively. Deflector 220 is rigidly secured to pipe 116' by a collar 230 mounted on pipe 116'. Collar 230 is rigidly secured to the inside wall of portion 200 of head 125. Second deflector 225 is supported by a base 235 which in turn is rigidly secured to the inside wall of portion 205 of head 125. Thus pipe 116' and first and second deflectors 220 and 225 are rigidly held in place with respect to one-another and portions 200 and 205 of head 125.

One or more holes 240 in portions 200 and 205 of head 125 permit the outflow of fluid substances in head 125.

Water and algae mixture 100 passes through pipe 116 and flows into head 125 as indicated by arrows 245. After passage through head 125, droplets containing a mixture of water, unbroken algal cells, oil, and residue leave head 125 through holes 240 as a flow indicated by droplets 250. As stated, these components settle in tank 130 as water layer 160, oil layer 155, and residue layer 165.

Head 125, scaled according to the size of tank 130, is typically a 25 cm cube, although other shapes and sizes can be used. Head 125 is preferably made of a strong and durable material such as steel, aluminum, or another metal, or a hard plastic. Deflectors 220 and 225 are scaled according to the size of head 125, as indicated in FIG. 2, although other sizes can be used. Deflectors 220 and 225 are made of a strong, durable material such as steel or other metal, although other hard materials including plastics and glasses can be used. The surfaces of deflectors 220 and 225 can be smooth or textured.

FIRST EMBODIMENT

Operation—FIGS. 1 and 2

Prior to operation of head 125, tank 130 is either new and unused, or emptied or nearly emptied of its contents from a previous separation operation.

After collection by various means from a source such as a growing pond (not shown), algae and water mixture 100 enters collection station 105 (FIG. 1). Valve 120 is normally open to permit mixture 100 to pass through pipe 110 into the inlet 114 of pump 115. When energized by power from source 90 through closed switch 95, pump 115 pumps mixture 100 through pipe 116 at high velocity and pressure. If the diameter of pipe 116 is 25 mm, a suitable flow rate is 200 l/m.

As mixture 100 leaves pipe 116' (FIG. 2), a portion of the flow travels along trajectories A and A' and forcibly impacts deflector 225 with a force sufficient to disrupt and break the cell wall membranes of a portion of the algal cells (not shown) contained in mixture 100. The flow of mixture 100 is of sufficient force to cause reflections along trajectories B and B', which in turn cause mixture 100 to strike deflector 220 with still sufficient force to disrupt and break additional cell walls of algae in mixture 100. Another reflection of flow 100 occurs along trajectories C and C', resulting in droplets 250 that bounce off various interior surfaces of head 125. Droplets 250 comprise a mixture of water, unbroken algal cells, oil, and residue (FIG. 1) and these droplets settle in tank 130 as the layers indicated.

Pump 115 continues to operate until either manually stopped, or until sensor switch 95 detects that the fluid level within tank 130 has reached its maximum desired, predetermined height. At that point, switch 95 opens to disconnect the source of energy and pump 115 stops.

After the pumping operation stops, tank 130 is filled with a mixture of water 160, unbroken algal cells, oil 155, and residue 165. These products will separate over time. In practice the separation is about 95% complete within 15 minutes. The margin between water and oil will continue to clarify as long as the fluids remain still. An operator can determine the quality of the separation by viewing layers 155, 160, and 165 through sight glass 169.

After separation, oil layer 155 is first harvested by being pumped or drained through pipes 177 or 178 into collection tank 185 (FIG. 1). This is followed by the removal of water layer 130 through port 191 in tank 130. Finally, residue layer 165 is removed through port 196 in tank 130 and delivered to biomass waste collection tank 199.

After the contents of tank 130 have been removed, tank 130 can be cleaned, inspected, and repaired if desired. Then the separation operation can begin again.

Scavenging Oil from the Algal Residue

FIG. 3

Additional oil can be scavenged from algal biomass waste 165. FIG. 3 shows a flowchart of a process for scavenging remaining oil from algal residue 165 at the bottom of tank 130 of FIG. 1. After the residue has been obtained (step 300), the process steps comprise: (1) drying residue 165 to a water content less than 10 percent (step 305), (2) pulverizing the dried residue (step 310), (3) reconstituting the dried residue by supplementing it with water in an amount sufficient to cover the surface (step 315), (4) bringing the residue and water mixture to a boil for a period of about one minute (step 320), then (5) allowing the mixture to cool to a temperature of about 5 degrees C. (step 325).

(6) As the mixture cools, the remaining oil in the residue will rise to the surface where it can be harvested and removed to another container by skimming, pumping, ladling, or another method (step 330). The remaining residue, comprising algal cell wall membranes and other non-oil components, can be discarded into landfill or used for another purpose such as agricultural fertilizer (block 335).

The drying can be accomplished using solar energy, or by other means such as a blow dryer or tumbler through which relatively dry air passes. The pulverizing can be accomplished by mechanical means such as tumbling in a rotating drum which has baffles and contains hard-surfaced objects such as river rocks. The reconstituting is done by adding water. The boiling can be done by any source of heat. The mixture can be allowed to cool by simply removing the source of heat, or alternatively providing refrigeration. Finally, the harvesting can be done by skimming with an absorbing material such as a paper towel, or by pumping.

CONCLUSION, RAMIFICATIONS, AND SCOPE

Accordingly the reader will see that, according to one or more aspects, we have provided a method and apparatus for separating oil from algae that is simple and low-cost in construction and operation, and that does not require solvent chemicals, enzymes, osmotic shock, ultrasonic energy, or mechanical or hydraulic pressing.

While the above description contains many specificities, these should not be construed as limitations on the scope, but as exemplifications of some presently preferred embodiments. Many other ramifications and variations are possible within the teachings.

For example, all aspects of the preferred embodiment are scaleable to any size and to handle any volume of material. In the preferred embodiment we assume a volume of approximately two cubic meters of bulk algae delivered in water slurry directly from a dredging operation at a growing source. Many kinds of algal material can be harvested and separated. In one aspect, the source may be from algae growing in tubes within a special facility constructed for that purpose. In another aspect, the source may be within an ocean or lake. Regardless of where it is grown, the algae from a collection station may be carried through a delivery conduit to a separator. The delivery conduit may be any length sufficient to carry the algae between the collection station and the processing station. After processing, additional conduits carrying a mixture or oil, water, and biomass residual, may be any length to carry the mixture to storage facilities. The number of storage facilities may be any number and sized adequately to handle the output. The system may be stationary or mobile, such as on a ship, barge, truck bed, or other surface.

Instead of discarding it, the waste water can be recycled through the same or another system in order to extract residual oil from it. Similarly, the biomass residue can be subjected to further refinement in order to extract more oil. The biomass residue can be compressed, dried, shredded or chopped, or otherwise rendered suitable for agricultural or other applications.

Instead of manual operation, the operation of the separation system can be automated. Instead of one settling tank, there can be many. Instead of one head in a tank, there can be a plurality of heads. Instead of entering the head horizontally, the pipe supplying the water-algae mixture to the head can enter the head from another angle, such as from above. Instead of a single pipe entering the head, a plurality of pipes can be used. A nozzle can be added to the pipe that delivers the water-algae mixture to the first deflector.

Instead of or in addition to a settling tank, one or more cyclonic separators can be used to separate the oil, water, and waste.

Other disrupting methods can be added to reflection from the deflectors, such as agitation of the deflectors, including ultrasonic agitation, heating, cooling, ultraviolet light exposure, gases, other liquids, and even pulverizing solids that are added to the input stream to the head.

The method and systems may be capable of a rate of production exceeding 10,000 liters per hour 24 hours a day, 365 days a year. Other features of the invention may include the reduction of the agricultural wastes in its volume by its near complete shredding, thus reducing the environmental impact of harvesting operations.

The oil extracted using the disclosed method and system may be production quality oil for conversion to biodiesel fuel, and at least a portion of the materials remaining after processing may be used for agricultural purposes.

Thus the scope should be determined by the appended claims and their legal equivalents, and not by the examples given.

The invention claimed is:

1. A system for extracting oil from algae, comprising:
a source of oil-containing algae and water,
a collection station,
a source of energy,
a head, said head containing at least one deflector having an impingement surface and at least one outlet port,
a pump having an inlet and an outlet, said inlet connected to said collection station, said outlet terminating within said head and capable of forcibly directing said algae and water against said deflector, while said pump is energized by said source of energy, in sufficient force to rupture at least a portion of said algae, thereby resulting in the release of a mixture comprising said oil, said water, and residue comprising algal cell walls,
a tank capable of receiving said mixture,
whereby when said tank is at least partially full and said pump is turned off, said mixture separates into three layers comprising substantially an upper layer of said oil, a middle layer of said water, and a bottom layer of said residue,
a plurality of ports in said tank for enabling removal of said oil, said water, and said residue from said tank,
whereby when said mixture has separated, said oil can be harvested and said water and said residue can be removed from said tank.

2. The system of claim 1, further including a valve in said inlet to said pump.

3. The system of claim 1 wherein said outlet of said pump comprises at least two sections that are joined by a coupler.

4. The system of claim 1 wherein said deflector is made from materials selected from the group consisting of metals, plastics, and glasses.

5. The system of claim 1 wherein said impingement surface of said deflector is selected from the group consisting of smooth and textured.

6. The system of claim 1, further including at least one additional deflector positioned to intercept the flow of said algae and water after said flow is deflected by said first deflector, thereby causing further disruption of said algae.

7. The system of claim 1, further including a float switch positioned on said tank so that when said tank is full, said float switch will open and disconnect said source of energy from said pump.

8. The system of claim 1, further including a system separate from said first-named system for extracting additional oil from said residue, comprising:
means for drying and pulverizing said residue,
means for reconstituting said pulverized residue with water,
means for boiling said pulverized residue and water mixture,
means for cooling said mixture, thereby allowing additional oil to rise to the surface of said mixture, and
means for harvesting said additional oil.

9. A system for extracting oil from algae, comprising:
a source of oil-containing algae and water,
a collection station for holding a quantity of said oil-containing algae and water,
a pump for pumping said oil-containing algae and water from said collection station,
a first deflector having an impingement surface,
at least one additional deflector positioned to intercept deflected and reflected flow of said algae and water after said flow is deflected and reflected by said first deflector thereby causing further disruption of said algae,
said pump arranged to pump said oil-containing algae and water from said collection station against said impingement surface with sufficient force to rupture at least a portion of said algae, thereby resulting in the release of a mixture from said impingement surface, said mixture comprising said oil, said water, and a residue comprising algal cell walls, and a tank arranged to receive said mixture upon release of a mixture from said impingement surface, so that when said mixture accumulates in said tank to a predetermined level and said pump is turned off, said mixture will settle into three layers comprising substantially an upper layer of said oil, a middle layer of said water, and a bottom layer of said residue, a plurality of ports in said tank for enabling removal of said oil, said water, and said residue from said tank, said ports being positioned at different heights in said tank so that said oil, said water, and said residue can be removed from said tank at different ports, whereby when said mixture has separated, said oil can be harvested and said water and said residue can be removed from said tank.

10. The system of claim 9 wherein said pump has an inlet and an outlet and further including a valve in said inlet to said pump.

11. The system of claim 9 wherein said outlet of said pump comprises at least two sections that are joined by a coupler.

12. The system of claim 9 wherein said deflectors is are made from materials selected from the group consisting of metals, plastics and glasses.

13. The system of claim 9 wherein said impingement surface of said deflector is selected from the group consisting of smooth and textured.

14. The system of claim 9, further including a float switch positioned on said tank so that when said tank is full, said float switch will open and turn off said pump.

15. The system of claim 9, further including a system separate from said first-named system for extracting additional oil from said residue, comprising:
    means for drying and pulverizing said residue,
    means for reconstituting said pulverized residue with water,
    means for boiling said pulverized residue and water mixture,
    means for cooling said mixture, thereby allowing additional oil to rise to the surface of said mixture, and
    means for harvesting said additional oil.

16. The system of claim 9, further including a head or housing, said deflectors being mounted in said head or housing, said head or housing having an outlet port for releasing said oil, said water, and said residue into said tank.

* * * * *